United States Patent [19]

Bish

[11] 3,788,532

[45] Jan. 29, 1974

[54] SADDLEBAG-TRAVEL CASE FOR A MOTORCYCLE

[76] Inventor: Raymond C. Bish, 1502 Oliver Bldg., Brockway, Pa. 15222

[22] Filed: June 22, 1972

[21] Appl. No.: 265,299

[52] U.S. Cl. .................................. 224/31, 224/32 A
[51] Int. Cl. .............................................. B62j 9/00
[58] Field of Search .... 224/32 A, 43, 44, 42.11, 34, 224/31

[56] References Cited
UNITED STATES PATENTS

| | | | |
|---|---|---|---|
| 3,362,596 | 1/1968 | Bostwick | 224/31 |
| 3,625,405 | 12/1971 | Kezar | 224/32 A |
| 2,511,949 | 6/1950 | Simon | 312/107 |

FOREIGN PATENTS OR APPLICATIONS

| | | | |
|---|---|---|---|
| 869,359 | 1/1942 | France | 224/32 A |
| 828,252 | 2/1960 | Great Britain | 224/32 A |

Primary Examiner—Gerald M. Forlenza
Assistant Examiner—Jerold M. Forsberg
Attorney, Agent, or Firm—Webb, Burden, Robinson & Webb

[57] ABSTRACT

A saddlebag-travel case device for mounting on the rear portion of a motorcycle, comprising a unitary, lower baggage container unit which is adapted to be fixedly attached to the frame of the motorcycle, said lower container unit surrounding the sides and rear of the motorcycle in wrap-around fashion. The rear of the lower container unit may be provided with tail lights and other traffic safety equipment. A unitary upper container unit is provided and it is detachably secured to the top of the lower container unit. The upper and lower container units are provided with latching and locking means and may be independently opened or locked when the upper container unit is in place or when said upper container has been detached.

9 Claims, 5 Drawing Figures

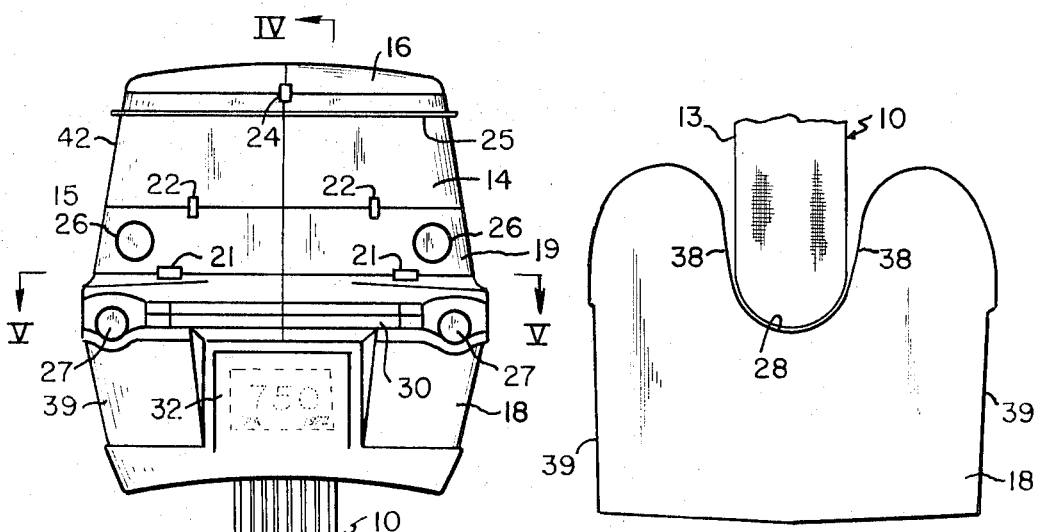
Fig. 2
Fig. 5
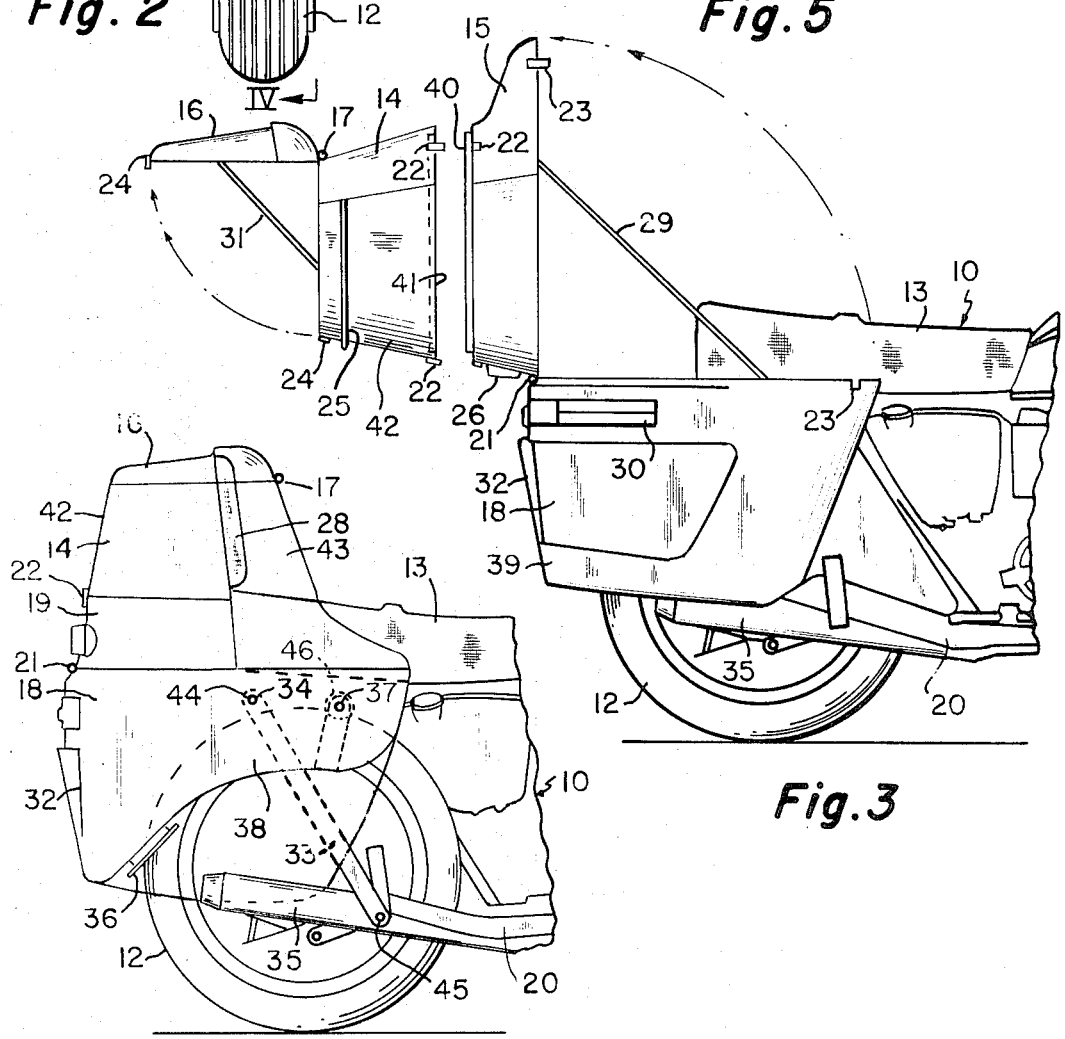
Fig. 3
Fig. 4

SADDLEBAG-TRAVEL CASE FOR A MOTORCYCLE

My invention relates generally to baggage carrier devices or so-called saddlebags for motorcycles. More particularly, my invention relates to a novel, unitary, wrap-around saddlebag and detachable travel case device for attachment to the rear of a motorcycle.

The conventional saddlebag carrier devices are supplied in pairs and are mounted on opposite sides of the rear wheel of the motorcycle using conventional mounting techniques. Cycle mounted saddlebags are especially useful for carrying supplies, clothing, tools and other necessary travel gear.

Should the cyclist-traveler stop for a night's lodging, for example at a motel, it is usually necessary for him to remove certain desired items from the conventional saddlebags and carry these loose items to his room. Attempts have been made to supply detachable saddlebags but these have not been completely satisfactory since these saddlebags, like the prior stationary bags, are limited in their storage capacity and they are also either quite vulnerable to theft or, on the other hand, difficult to remove from the motorcycle and difficult to carry due to their construction limitations.

My invention eliminates many of the problems inherent in these prior carrier devices by providing a unitary saddlebag-travel case device with relatively compact dimensions and yet greatly increased internal carrying capabilities.

My invention likewise provides a unitary saddlebag-travel case device with a convenient, travel bag unit which may be quickly detached from the lower saddlebag unit and easily carried by the cyclist.

Further, my invention provides a unitary saddlebag-travel case device especially adapted for convenient mounting on a motorcycle.

Still further, my invention provides a unitary saddlebag-travel case which is difficult to remove or open by unauthorized persons.

Further, my invention provides a unitary saddlebag-travel case device which is economical to manufacture using standard techniques and with only minor modifications my device may be adapted to fit any of the various makes and models of motorcycles.

Still further, my invention provides a unitary saddlebag-travel case device affording increased safety to the cyclist resulting from the prominent placement of tail lights, turn signals and safety reflectors on the rear portion of the wrap-around carrier device.

Still further, my invention provides a unitary saddlebag-travel case device in which the front portion can be easily adapted to function as a padded back rest for a cyclist.

In accordance with my invention, a unitary saddlebag-travel case device for mounting on a motorcycle is provided, comprising a lower baggage container unit which extends in wrap-around fashion from opposite sides of the rear wheel of the motorcycle and around the rear thereof. Means for securely mounting said lower container unit to the motorcycle frame are provided. An upper baggage container unit is provided including means for detachably securing said upper container to the lower container unit. Latching and locking means are likewise included to prevent unauthorized opening or removal.

In the accompanying drawings, I have shown my presently preferred embodiments of my invention in which:

FIG. 2 is a rear elevational view of the device of FIG. 1.

FIG. 3 is a side elevational view of the rear portion of the motorcycle showing the device of my invention in an exploded side view.

FIG. 4 is a view in side elevation of the rear portion of the motorcycle exhibiting a side sectional view of my invention taken along line IV—IV of FIG. 2.

FIG. 5 is a plan sectional view of my invention taken along line V—V of FIG. 2.

Reference will now be made to the specific details of the drawings, wherein like parts are designated by the same numerals throughout the various views.

Figure 1:
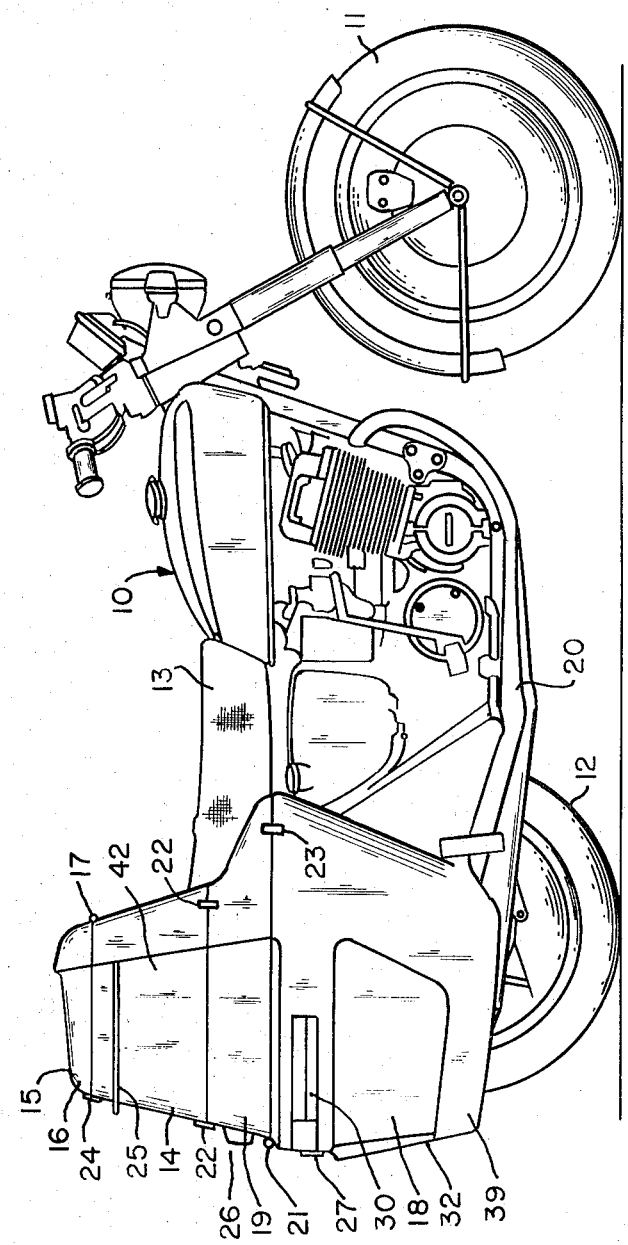
FIG. 1 is a side elevational view of a conventional motorcycle with a presently preferred embodiment of my invention mounted on the rear frame portion thereof.

FIG. 1 shows a conventional motorcycle, generally designated 10, having a structural frame 20 supporting it. A conventional front wheel 11 and rear wheel 12 are also shown mounted on the frame 20. A seat 13, of conventional design, is also provided.

A presently preferred embodiment of the baggage carrier device of my invention, designated generally 15, is shown mounted on motorcycle 10 in travel position, FIG. 1. The unitary saddlebag-travel case device 15 is adapted to be mounted on the motorcycle 10 adjacent the rear wheel portion 12, surrounding the rear of cycle 10 in wrap-around fashion. Preferably, the baggage carrier 15 of my invention is made from glass fiber reinforced plastic using known molding techniques. This type of construction affords a strong and yet light weight carrier.

As seen most easily in FIG. 3, the carrier 15 comprises a lower saddlebag portion or lower baggage container unit 18. Lower baggage container 18 has a hollow interior which surrounds the sides and rear of the rear wheel 12. This interior is defined by interior and exterior sidewalls 38 and 39 respectively; interior sidewall 38 is adjacent the rear wheel 12, see particularly FIG. 4. The wrap-around construction of lower unit 18 yields an interior with greatly increased storage volume.

Referring again to FIG. 3, the lower baggage container unit 18 has means associated therewith for allowing access to the interior thereof, said means preferably in the form of closure lid 19 which is pivotally connected at the top portion of lower unit 18 by hinge connection 21. Also associated with lid 19 are conventional locking latches 23, of the type usually employed on luggage, mounted on either side of the lower unit 18 adjacent lid 19. Hence, when lid 19 is in the locked position, access cannot be gained to the interior of the lower container unit 18. Lid 19 also serves to prevent the entry of water or dust into lower unit 18 so as to protect the contents therein. A stop cord or chain 29 may also be attached to lid 19 and unit 18 in order to limit the movement of the lid 19, see FIG. 3.

Referring still to FIG. 3, a detachable travel case or upper baggage container unit 14 is provided and it likewise has a hollow interior, defined by sidewalls 42 and bottom surface 41. The upper container unit 14 has associated therewith means for allowing access to the interior thereof, preferably in the form of closure lid 16 which is pivotally connected to the upper unit 14 by hinge connection 17. Latching means 24 may be employed so that lid 16 may be lockably secured to container 14. A lid stop cord or chain 31 may likewise be attached to lid 16 and upper unit 14 to inhibit excess movement of lid 16. A carrying bar or handle 25 is provided near the top of the detachable upper container 14. Carrying bar 25 is attached to upper container 14 and extends around the rear and two adjacent sides of said container 14. Carrying bar 25 will serve as a handle when travel case 14 is removed from lower unit 18 and hand carried, and in addition to being ornamental, it will also serve as a convenient securement means for attaching tie down straps if extra gear is carried on top of the travel case.

The travel case or upper baggage container 14 is detachably mounted onto the upper portion of the lower container unit 18. As shown in FIG. 3, the top edge 40 of the lower lid 19 may be built-up and a corresponding or mating recessed edge may be formed on the lower surface 41 of travel case 14 to insure that travel case 14 fits snugly onto the top of lower container unit 18. Means for detachably securing the upper unit 14 to lower unit 18 are provided preferably in the form of conventional luggage locking latches 22. Latches 22 are mounted adjacent the mating interface between the upper unit 14 and lower unit 18 so that the travel case 14 may be securely latched and locked in place. Hence, the travel case 14 cannot be removed from the motorcycle 10 unless the proper key is employed to unlock latches 22. This latching arrangement also yields a stable, unitary carrier which is particularly able to withstand the forces of wind and vibration.

Referring now to FIG. 2, the rear of the lower stationary baggage container unit 18 may be supplied with an array of safety lighting equipment such as tail lights 27, turn signals 26 and reflectors 30. Since the lower unit 18 wraps around the rear of motorcycle 10 and because unit 18 is stationary, it is adaptable for the installation of appropriate electrical wiring (not shown). A license plate recess housing 32 may also be provided and it may likewise be supplied with a light if desired. Safety lights and reflectors may also be mounted on both sides of the lower container unit 18 in order to improve the night safety features of the motorcycle 10, see side reflector 30 of FIG. 1.

Referring now to FIGS. 4 and 5, it can be seen that the interior sidewall 38 of lower unit 18 surrounds the rear wheel fender portion 12 and the rear portion of seat 13. In the mounted position, the front sidewall 43 of travel case 14 is coextensive with the contour of interior sidewall 38 and , as such, said front sidewall 43 extends upward and around the rear portion of motorcycle seat 13 to form a convenient back rest area. As seen in FIG. 4, a back rest pad 28 is attached to the front sidewall 43 of travel case 14. It can be appreciated that such a back rest would serve as a comfortable travel aid to the motorcycle rider.

An inherent feature of my unitary saddlebag-travel case 15 is that it can be manufactured using conventional techniques to fit any model or make motorcycle with only minor mold modifications. The saddlebag portion or lower baggage container unit 18 is adapted to be attached to the rear of the motorcycle frame 20. Referring particularly to FIG. 4, the lower container unit 18 has an elongated mounting bracket 33, preferably made of metal, attached or laminated to the interior sidewall portion 38 of unit 18 between sidewall 38 and rear wheel 12. Bolt holes 44 and 45 are provided at the ends of bracket 33. Preferably, the lower portion of bracket 33, adjacent lower hole 45, extends beyond interior sidewall 38 and is formed so as to avoid muffler 35 and wheel 12.

A duplicate mounting bracket (not shown), also provided with bolt holes, is mounted or laminated to interior sidewall portion 38 on the opposite side of rear wheel 12 in the same manner as the aforesaid bracket 33. Duplicate pairs of mounting holes 34 and 37 are formed through interior sidewall 38 of lower container 18 on opposite sides of rear wheel 12. Aligned with sidewall hole 34 is the mounting bracket bolt hole 44. A pair of reinforcing washers 46 may also be employed if extra strength is desired. The reinforcing washer 46 is preferably of metal and is attached or laminated to the interior sidewall 38 positioned around the bolt hole 37. A duplicate washer 46 is positioned on the opposite side of rear wheel 12. The mounting bracket 33 extends transversly across the interior sidewall 38 and terminates beyond so as to lend vertical support to the lower unit 18. Preferably, six frame mounted bolts are attached to the motorcycle, three of said bolts mounted on each side of the rear wheel portion 12. These frame mounted bolts are preferably positioned such that four of them fit into the top pair of holes 34 and 37 of the interior sidewall 38 and two of them fit into lower extended bracket holes 45. Hence, to mount the lower unit 18, only six bolt connections need be made. Four of the six bolt connections, those at holes 34 and 37 at opposite sides of rear wheel 12 are located within the interior of lower container unit 18. If the lid closure 19 of lower unit 18 is locked, the lower unit cannot be removed from the frame since necessary bolt connections are located within the locked unit.

Due to the unitary, wrap-around construction of my device, it may be desirable to provide an exhaust heat shield 36 located adjacent the open end of exhaust pipe muffler 35 in order to protect the lower unit 18 and its contents from exhaust heat. Heat shield 36 may be constructed of sheet metal laminated asbestos or other heat resistant material. The heat shield 36 is attached to interior sidewall 38 in spaced relationship therefrom so as to protect the sidewall from direct impingement of exhaust gas. Shield 36 may also be inclined at an angle, relative to the stream of hot exhaust gas, so as to deflect the gas downwardly and away from unit 18; see FIG. 4.

While I have herein shown and described the presently preferred embodiments of my invention it is understood that it may be otherwise embodied within the scope of the appended claims.

I claim:

1. A baggage carrier device for attachment to the rear portion of a motorcycle which comprises:

A. a lower baggage container unit, having interior and exterior sidewall portions, said sidewalls defining a hollow interior, said lower container unit contoured to surroundingly fit onto the rear portion of a motorcycle, extending from one side of the rear wheel, around the rear of the motorcycle to the opposite side of said rear wheel in wrap-around fashion;

B. attachment means associated with the lower baggage container unit for mounting said lower baggage unit to the rear portion of the motorcycle;

C. means associated with said lower baggage container unit for allowing access to the interior thereof;

D. an upper baggage container unit having a hollow interior defined by sidewall portions and upper and lower surface portions, the lower surface of said container adapted to matingly fit onto the lower luggage container unit, said upper container unit also including a padded front sidewall portion adjacent the motorcycle seat area, said front sidewall portion providing a back rest for a person seated on the motorcycle;

E. means for detachably securing the upper baggage container unit to the lower baggage container unit whereby the upper container unit may be selectively locked to said lower unit or completely removed therefrom;

F. means associated with the upper baggage container unit for allowing access to the interior thereof; and G. handle means associated with the upper container unit for carrying said upper unit when it is detachably removed from the lower container unit.

2. The baggage carrier device of claim 1, wherein the attachment means associated with the lower container unit for mounting said lower unit to the rear portion of the motorcycle includes: a lower container unit having a plurality of bolt holes formed in spaced relationship through the interior sidewalls thereof, said bolt holes being formed on opposite interior sidewalls of said lower unit adjacent the rear frame of the motorcycle and positioned to receive frame mounted bolts therethrough such that the corresponding nuts will be located within the interior of said lower luggage container unit; said attachment means also including a pair of elongated mounting brackets, each having a plurality of bolt holes formed therethrough, said pair of mounting brackets each attached to opposite interior sidewall portions of the lower container unit and adapted to engage frame mounted bolts on opposite sides of the motorcycle.

3. The baggage carrier device of claim 1 wherein the means associated with the lower container unit for allowing access to the interior thereof includes: a lower container unit having a unitary lid portion, pivotally attached at the top of said container and enclosing the top thereof; and also including latching means associated therewith for lockably securing said lid portion to the lower container unit so as to prevent unauthorized access to the interior of said lower unit.

4. The baggage container device of claim 1 wherein the means for detachably securing the upper luggage container unit to the lower container unit includes latching means associated with said upper and lower container units for lockably securing the upper container unit to the lower container unit so as to permit the complete removal of said upper container unit when said latching means is unlocked.

5. The baggage carrier device of claim 1 wherein the means associated with the upper container unit for allowing access to the interior thereof includes a lid portion pivotally connected to the top of said upper container and including latching means for lockably securing said lid portion to said upper container to prevent unauthorized access to the interior thereof.

6. The baggage carrier device of claim 1 wherein the handle means comprises a carrying bar attached to the upper container unit extending around the rear and two adjacent sides thereof.

7. The baggage carrier device of claim 1 wherein the lower container unit also includes tail lights, turn signal lights, safety reflectors and a license plate mounting area incorporated onto the rear portion of the said aforementioned lower container unit.

8. The baggage carrier device in claim 1 wherein the lower container unit includes a heat shield constructed of heat resistant material and attached to the interior sidewall portion of said lower container unit positioned between the interior sidewall of said lower unit and the exhaust pipe of the motorcycle so as to protect the sidewall of the lower unit from direct impingement of the hot exhaust gases thereon.

9. The baggage carrier device of claim 1 wherein the upper container unit and the lower container unit are molded from glass fiber reinforced plastic.

* * * * *

UNITED STATES PATENT OFFICE
CERTIFICATE OF CORRECTION

Patent No. 3,788,532          Dated  January 29, 1974

Inventor(s)  Raymond C. Bish

It is certified that error appears in the above-identified patent and that said Letters Patent are hereby corrected as shown below:

On the first page of the patent:

Applicant's address reads --1502 Oliver Bldg., Brockway, Pa. 15222--. It should read --R. D. #2 Brockway, Pa. 15824--.

Signed and sealed this 9th day of April 1974.

(SEAL)
Attest:

EDWARD M. FLETCHER, JR.
Attesting Officer

C. MARSHALL DANN
Commissioner of Patents